Patented June 15, 1948

2,443,450

UNITED STATES PATENT OFFICE 2,443,450

ARTICLE COATED WITH N-ALKOXYMETHYL POLYAMIDE AND PROCESS OF MAKING SAME

Boynton Graham, Wilmington, Del., and Howard S. Turner, Swarthmore, Pa., assignors to E. I. du Pont de Nemours & Company, Wilmington, Del., a corporation of Delaware No Drawing. Application July 1, 1943,
Serial No. 493,106

12 Claims. (Cl. 117—161)

1

This invention relates to the art of coating and more particularly to the manufacture of flexible coated fabrics.

Various polyamides of the nylon type, namely, those of the kind described in U. S. Patents 2,071,250, 2,071,253 and 2,130,948, have been studied and proposed for use as the chief ingredient in flexible coatings for fabric sheet materials. Among the polyamides developed for this purpose are the N-alkoxy-methyl polyamides described in application Serial No. 445,635, filed June 3, 1942, now abandoned, by Theodore L. Cairns. These polymers are obtained by reacting in the presence of an oxygen-containing acid catalyst the above mentioned nylon polyamides having a hydrogen-bearing amide group with formaldehyde and a formaldehyde-reactive organic compound such as an alcohol, mercaptan, amide, sulfonamide, amine and phosphine, which have hydrogen attached to an element by groups V and VI, series 2 and 3, of the periodic table. When the formaldehyde-reactive compound is an alcohol the functional groups —NH—CO— of the polyamide are converted to the functional groups —N(CH$_2$OR)—CO— in which R is any organic radical.

Although as compared to the unmodified polyamide the above mentioned N-alkoxymethyl polyamides possess notable solubility and other advantages, they are in general insufficiently soluble in the most practical coating solvents for use in conventional coating equipment. In addition the coatings obtained are sometimes more tacky than desired and lack the high resistance to cracking on repeated flexing that is required for use as upper material in footwear and for other uses involving excessive flexing of the coated fabric.

This invention has as an object the production of new and useful coated fabrics and artificial leather products having unusual flexibility, durability, and other valuable properties. Other objects will appear hereinafter.

These objects are accomplished by the production of N-alkoxymethyl polyamides of improved physical characteristics and the application of these polymers as coatings to flexible sheet material. These nitrogen substituted polymers are obtained by reacting a synthetic linear polyamide of the kind described herein and having a relative viscosity (defined hereinafter) above 40 with an alcohol and formaldehyde in the presence of an oxygen-containing acid catalyst, and then treating the obtained N-alkoxymethyl polyamide which contains amide groups substi-

2 tuted with alkoxymethyl groups and amide groups substituted with methylol groups, to reduce the methylol substitution to less than 4% of the total number of amide groups in the polyamide. The combined number of amide groups substituted either with alkoxymethyl or with methylol groups remaining after treatment should be at least 28% of the total number of amide groups in the polyamide. In the best method of practicing the invention the polyamide used in forming the nitrogen substituted product is polyhexamethylene adipamide and the alcohol is a monohydric aliphatic alcohol having less than 3 carbon atoms.

The accomplishment of the above objects has resulted from certain observations and discoveries made in the study of the N-alkoxymethyl polyamides which have been described previously and which for the present purpose are obtained by using alcohols, preferably aliphatic monohydric alcohols, as the formaldehyde-reactive compound. These observations relate mainly to the molecular weight of the initial polyamide, as expressed by its relative viscosity defined hereinafter, and to the presence and effect of methylol groups in addition to alkoxymethyl groups in a polyamide bearing these substituents on the amide groups.

The effect of the presence of the N-methylol groups that are normally present in addition to the N-alkoxymethyl groups will be considered first, and the importance of obtaining the present nitrogen substituted polymers from polyamides of high relative viscosity will be considered more particularly later.

With regard to these methylol groups which it has been found advantageous to remove from the present polymers, it is to be observed that the reaction in which these polymers are formed involves apparently an initial formation of the N-methylol polyamide, and then the etherification of most of these groups with the alcohol present to form the N-alkoxymethyl polyamide. In any event, N-alkoxymethyl polyamides unless specially treated, when prepared by the method above outlined, contain free methylol groups. It has been discovered that when the number of methylol groups in the N-alkoxymethyl polyamides is kept very low, and when these polymers are derived from the mentioned polyamides of high relative viscosity, there is a marked improvement in physical properties including solubility characteristics, in resistance to change in solubility of the coating solutions on long heating, and in working characteristics in the preparation of coated fabrics. The polymers of this invention form adequately stable solutions in ethanol containing small proportions of water. In the case of polymers having a lower total amide substitution with N-alkoxymethyl and N-methylol groups than the polymers claimed herein, a moderate improvement in solvent power in blends of alcohol and water is obtained by increasing the proportion of water to 30–40%, but this change severely limits the varieties of plasticizers which can be used in such solutions.

The above advantages in the practice of this invention with regard to the factor of low methylol substitution are obtained when the substituent groups on the amide nitrogens are predominantly N-alkoxymethyl groups. More specifically these polymers have more than 28% and preferably more than 33% of the total number of amide nitrogens substituted by alkoxymethyl and methylol groups respectively, and of this total less than 4% of the amide groups substituted by methylol groups. The combined number of amide groups so substituted does not as a rule exceed 70% of the total number present since polymers of higher substitution are more difficult to produce.

The per cent of total substitution of the amide groups with alkoxymethyl and with methylol groups and the per cent substitution of the amide groups with methylol groups alone can be determined by known analytical methods. For example, when polyamides containing N-alkoxymethyl and N-methylol groups are subjected to hydrolysis under acid conditions, formaldehyde is liberated by both groups and can be determined by standard procedures. From this determination the total per cent substitution of the amide nitrogens by alkoxymethyl and methylol groups can be calculated. A second determination of the amount of formaldehyde liberated by the methylol groups alone can be made according to the procedure described in Schneider application Serial No. 445,651, now abandoned, and the per cent of the amide groups substituted with methylol groups can be calculated therefrom. The per cent of the total number of amide groups substituted with alkoxymethyl groups can then be obtained by difference.

The N-alkoxymethyl polyamides obtained as described in the above mentioned Cairns application are further treated, as disclosed in more detail hereinafter, to reduce the number of amide groups substituted by the methylol groups to less than 4% of the total number of amide groups in the polymer. In the case of the preferred polymers, N-methoxymethyl or N-ethoxymethyl polyhexamethylene adipamide, the number of amide groups substituted with methylol groups is usually in the neighborhood of from 0 to 2.4% of the total number of the amide groups present.

The N-alkoxmethyl polyamides, which are further treated in the manner described below to reduce the per cent of methylol substitution, are obtained as described in the previously mentioned Cairns application Serial No. 445,635 by reacting in the presence of an oxygen-containing acid catalyst such as formic or phosphoric acid, a synthetic linear polyamide having a hydrogen-bearing amide group, with formaldehyde and an aliphatic alcohol.

In one procedure the N-substituted products are made by dissolving the polyamide in formic acid, preferably in 50–100% concentration, and reacting the solution with the alcohol and formaldehyde at moderate temperatures which are usually 25°–75° C. but can be as low as 0° C., to an upper temperature of 150° C. or more as limited by the stability of the polymer provided the heating is not long enough to cause degradation of the polyamide chain. For example, the polyamide obtained from hexamethylene-diamine and adipic acid is dissolved in formic acid at 50° C., a solution of paraformaldehyde in methanol added, and the solution allowed to stand at 60° C. for about thirty minutes. The reaction product can be isolated by adding the reaction mixture to a solution of acetone and water (1:1) by volume which forms a clear solution from which the N-methoxymethyl polyhexamethylene adipamide separates after the addition of excess ammonia. Another method of isolation consists in the addition of the reaction mixture to aqueous sodium hydroxide. The degree of substitution varies widely with the reaction conditions such as time, temperatures, etc., and particularly with the amount of formaldehyde and water. Increase in the amount of the formaldehyde in the reaction mixture increases substitution, and decrease in the amount of water also increases the degree of substitution.

A method for treating the N-alkoxymethyl polyamide to reduce or eliminate the N-methylol substitution to the degree required in the polymers of this invention without interfering with the control of total substitution consists in adding a large amount of methanol near the end of the reaction described above for making the nitrogen substituted polyamide.

The N-methylol substitution of the polymers can also be reduced by other chemical treatments. For example, the N-methylol groups of N-methoxymethyl polyhexamethylene adipamide can be hydrolyzed selectively, or these groups can be methylated with methylating agents to produce N-methoxymethyl substitution from the N-methylol groups. Also N-methylol groups can be hydrolyzed off the polymer chain by heating the polymer with 10% aqueous sodium hydroxide for 1 hour at 100° C. or the polymer can be treated in aqueous alcohol solution with an aqueous solution of sodium sulfite and heating at 60° C. for 90 minutes. If the N-methoxymethyl polyhexamethylene adipamide is being compounded or milled or mechanically worked for calendering, the N-methylol groups can also be removed by working the polymer for a few minutes at 100° C. with aqueous sodium sulfite.

Elimination of the N-methylol groups by methylation can be carried out by dissolving 150 parts of the polymer in 400 parts of methanol to which is added 60 parts of 90% formic acid and the mixture refluxed for 1.5 hours. After this period of heating the solution is poured into a large volume of water which precipitates the N-methoxymethyl polyhexamethylene adipamide. Neutralization is effected with concentrated ammonium hydroxide. The precipitated polymer is washed in running water and dried at 50° C.

The present polymers, in addition to low methylol substitution, must be obtained from unmodified polyamides of high molecular weight as is measured by the relative viscosity which is defined herein as the ratio of the absolute viscosity of an 8.35% solution of the polyamide in 90% formic acid to the absolute viscosity of 90% formic acid. The relative viscosity is somewhat more useful in this instance as a measure of molecular weight than is intrinsic viscosity (defined in U. S. Patent 2,130,948) which varies more slightly with great changes in molecular weight. The N-alkoxymethyl polyamides used in the practice of this invention are derived from polyamides having a relative viscosity of at least 40 and preferably of at least 80 which is considerably higher than that of polyamides manufactured for general use where the relative viscosity is about 15–30. Polyamides having the higher relative viscosities used in the practice of this invention are obtained by condensing a diamine with a dibasic acid in molecularly equivalent amounts and in the absence of "stabilizer," and by following the usual heating period with a short heating under vacuum.

The remarkable increase in flex durability brought about by the use of N-alkoxymethyl polyamides derived from polyamides of high relative viscosity is shown in the table below where the first column gives the relative viscosity of polyhexamethylene adipamide used in preparing the N-methoxymethyl derivative, and the second column gives the Schiltknecht flex cycles required to produce cracking of the N-methoxymethyl polyhexamethylene adipamide coating at 0° F. Several polyhexamethylene adipamides differing in relative viscosity were converted to the N-methoxymethyl derivative, each modification carried out to substantially the same degree. These modified polyamides were each blended with the same amount of plasticizer and pigment, and coated on cloth. The resulting coated fabrics were tested for resistance to cracking on repeated flexing using a Schiltknecht machine under the especially severe conditions of 0° F. The Schiltknecht flex test is conducted on a machine described in bulletin No. 105 of Alfred Suter, 200 Fifth Avenue, New York, N. Y.

| Relative Viscosity of Initial Polyamide | Flex Cycles Required to Produce Cracking |
|---|---|
| 26 | 100,000 |
| 48 | 200,000 |
| 100 | 330,000 |
| 160 | 1,100,000 |

Three analytical measurements, therefore, are involved in the manufacture of the present polymers and in their identification, namely, the determination of relative viscosity in selection of the initial polyamide, and the determination of both total formaldehyde liberated on hydrolysis by the alkoxy methyl groups and the methylol groups combined and the formaldehyde liberated on hydrolysis by the methylol groups alone.

Compositions comprising the special type of polyamides specified above can be applied to the flexible base material by several methods. For example, the polymer is dissolved in a volatile solvent with heat and stirring. The solutions, containing also dissolved or suspended plasticizer, pigments, and fillers if desired, may be spread over the flexible base and the solvent removed therefrom by extraction or preferably by evaporation and with heat. Further successive coats may be applied until a coating of the desired thickness is achieved.

Another convenient method of applying these compositions is by calendering or milling techniques. This procedure may be employed for the application of coatings on flexible fabrics, or calendering may be used to produce unsupported sheets. In order to avoid undesirable chemical changes and reduction in total substitution during the milling or calendering procedures, the polymers must meet the requirements stated above for less than 4% methylol substitution. For example, polymers containing greater than 4% methylol substitution are converted at milling temperatures to a hard, horny, intractable mass whereas the products of the present invention can be calendered readily without special precautions. Depending upon the particular polymer, a suitable calendering temperature will be from 80°–120° C., preferably 100°–110° C. Furthermore, the addition of water to the milling composition is also of considerable assistance in such calendering applications, permitting the satisfactory calendering of polymers of the relatively low total formaldehyde content and allowing the calendering of higher substituted polymers at lower temperatures than would be otherwise possible. There is no limit to the amount of water which can be used, but 10–20% based on the polymer has generally yielded good results. The water may subsequently be evaporated from the calendered product. It is frequently desirable first to apply to the fabric or other flexible base a solution coating of polymer or of other resinous material in order to improve adhesion of the calendered coating.

In formulating compositions for calender coating or sheeting of N-methoxymethyl polyhexamethylene adipamides, it is desirable to employ 10–30% by weight of a pigment such as a soft carbon black, preferred due to its less adverse effect upon the properties of the composition at low temperature than many other pigments. Similar quantities of mica are useful in modifying these polyamides to obtain improved solvent resistance. Small amounts of a vegetable or fatty oil or a wax alcohol are incorporated to assist in stripping films from the calender rolls.

Other methods for preparing the N-methoxymethyl polyhexamethylene adipamide coated fabric products include the lamination of preformed films of the polymer composition to the flexible base by means of heat and pressure or with the aid of adhesive, the spraying of the base with solutions or melts of the polymer composition, and application to the base of the polymer composition in the form of an emulsion or dispersion, followed by evaporation of the vehicle. Furthermore, an extruded film of the coating composition may be applied directly to the base material, or the base material may be drawn through a melt or solution of the coating composition.

Important modifications in the properties of the coated products prepared as described above can be brought about by subsequent heat treatments, or baking at temperatures from 90° to 125° C. Thus, simple baking, hot calendering or embossing markedly improve such properties as adhesion, water resistance, hardness, solvent resistance, stiffness, surface dryness, and impermeability to vapors and gases. These effects are particularly evident when there is incorporated in the coating composition a small amount (1% by weight is generally enough) of a nonvolatile, oxygen-containing acidic catalyst such as phosphoric acid. The time and temperature of the heat treatment may be varied according to the degree of modification which is desired. Thus, baking for 24 hours at 105° C. yields a greatly modified product as do briefer treatments at higher temperatures, or longer treatments at lower temperatures. Solvent-coated products which have been subjected to only a minimum of heat during their preparation are especially amenable to such heat treatments.

A further method of modifying the coated products lies in the subsequent application of thin topcoats of a different composition such as ethyl cellulose, vinyl chloride/vinyl acetate copolymers, pyroxylin, etc. In addition, improvements in appearance, surface dryness, hardness, and toughness of N-methoxymethyl polyhexamethylene adipamide may be gained by the application of a final topcoat containing less plasticizer or pigment, specifically to improve surface dryness, such as the effect produced by applying a thin topcoat containing a relatively high concentration of finely divided silica, or by the application of a final topcoat containing a dulling agent to reduce gloss, or by using a less highly substituted polyhexamethylene adipamide.

The products of the invention can also be embossed with suitable grains according to standard procedures.

A further novel method of effecting surface modification lies in surface hydrolysis of the finished products. Such hydrolysis, effected by brief warming in contact with dilute mineral acids yields a product possessing extremely leather-like grain characteristics which is capable of undergoing such standard leather treatments as hand-boarding. Surface treatments by acid may also be effected as an acid wash producing a controlled amount of hydrolysis of substituent groups on the surface of the coating with resultant improvement in freedom from surface tack.

This invention is further illustrated by the following examples in which the parts are by weight.

*Example I*

A shoe upper type material is obtained as follows:

N-methoxymethyl polyhexamethylene adipamide having a combined total of about 30% of the amide groups substituted with methoxymethyl and methylol groups and having 1.2% of the amide groups substituted with methylol groups is prepared from 10 parts of polyhexamethylene adipamide having a relative viscosity of 161 and a melt viscosity of 52,000 poises at 285° C.; 35 parts of 90% formic acid, 12 parts of paraformaldehyde; and 20 parts of methanol. Twenty-eight and six-tenths parts of the above polyamide, 15.4 parts of methyl 10-phenylolstearate as plasticizer, 0.45 part of triethanolamine, 7.8 parts of water and 70.3 parts of ethanol are heated and stirred at 60° C. until the polyamide has dissolved. The resulting composition is designated as composition A. A second solution is prepared by dissolving 91 parts of the polyamide in 25 parts of water and 225.2 parts of ethanol. To this solution is added 29.4 parts of methyl 10-phenylolstearate, 1.44 parts of triethanolamine and a dispersion of 2.8 parts of carbon black in 19.6 parts of methyl 10-phenylolstearate. This composition is designated as composition B.

Two coats of composition A at 60°–70° C. are spread with a doctor blade over 1.32–53" sateen fabric, each coating followed by drying at approximately 60° C. The coated fabric is then passed through calender rolls at 160° C. Using the same procedure of drying between coats at 60° C., forty coats of composition B are applied at 60°–70° C. bringing the coating weight to 9.9 oz./50" yd.

The resulting coated fabric is found to be extremely pliable, shows very great resistance to cracking on repeated flexing, has excellent cold crack, and shows remarkable retention in these properties after extended exposure to high temperatures. Tests show that 180 million Schiltknecht flex cycles are required to produce an initial break in the coating, and that under an accelerated aging test after baking 170 hours at 105° C. the coating withstands one hundred to one hundred twenty million flex cycles before cracking. The scrub test cycles (Automotive Industries, 49, 1262) required to produce an initial break in the coating are 52,000. The cold crack temperature is −60° F. before the mentioned heat treatment and is −53° F. after this treatment. The Tinius Olsen stiffness value is 43.

The coated fabrics of this invention also show upon test a marked improvement over other nylon coated fabrics in which the polyamide coating is one of the best previously used for the present purpose. Thus in the case of a plasticized and pigmented high viscosity interpolymer which is composed of hexamethylenediammonium adipate, hexamethylenediammonium sebacate, and epsilon-caprolactam, and which has a relative viscosity of 109, the coating of this polymer cracked when the fabric was folded sharply at −40° F. The Tinius Olsen stiffness value was 69. The coating failed after an average of 49 million flexes in the Schiltknecht flex test at 77° F. and developed coating breaks after 28,700 cycles in the Scrub test. A sample of similar composition cracked in less than 1 million flexes in the Schiltknecht flex test at 77° F. after aging for 7 days at 105° C.

*Example II*

Three parts of 90% formic acid (sp. gr.=1.20) is charged into an open stainless steel reaction vessel, equipped with a stirrer, one part of polyhexamethylene adipamide (rel. viscosity=100; intrinsic viscosity=1.0) pulverized to pass a ¼" screen is added and the mixture heated to 60° C. Solution of the polyamide is complete within 60 minutes. A second solution consisting of 0.993 part of paraformaldehyde (95% aldehyde), 1 part of methanol and 0.0006 part of sodium hydroxide is prepared at 60° C. in an open stainless steel vessel and 0.5 part of methyl formate is added. The aldehyde solution is added to the polyamide solution over a 3.5 minute period with good agitation. The reaction mixture is maintained at 60° C. and 8 minutes after all the aldehyde solution has been added 1 additional part of methanol is added to the reaction mixture. Seventeen minutes later (25 minutes after all the aldehyde solution has been added) 2 parts of additional methanol is added and 5 minutes later the reaction mixture is discharged into a precipitation tank containing 28 parts of cold aqueous acetone (44% acetone by weight). The resulting solution is stirred vigorously and neutralized with aqueous ammonia. The product precipitates in finely divided, free-settling granular form. It is separated from the mother liquor by centrifuging and is washed by reslurrying with water. The centrifuged product is dried in vacuum at 50° C.

The reaction product as prepared contains 36% of the total number of amide groups substituted with methoxymethyl and methylol groups and has 1.2% of the amide groups substituted with methylol groups.

A coating solution designated as solution A is prepared by heating together for two hours with stirring at 70° C. a composition comprising 11.8 parts of the N-methoxymethyl polyhexamethylene adipamide described above, 6.4 parts of methyl 10-phenylolstearate, 30.4 parts of 95% ethanol, and 3.4 parts of water. Using standard spreading equipment, employed by the industry for coating fabrics with solutions of resins, two coats of solution A are applied to a 1.32–53" high count sateen fabric. During the coating the solution is maintained at 50°–70° C., and drying of the coatings between coats is effected for two minutes at 80° C. After the application of the two coats of solution A, the unfinished coated fabric is passed between calender rolls with a hot roll at 175° C. in contact with the coating and the cold roll in contact with the fabric.

A pigmented coating solution, designated as solution B, is prepared by dissolving 37.9 parts of the N-methoxymethyl polyhexamethylene adipamide in a solvent comprising 110.5 parts of 95% ethanol and 11 parts of water. The polymer is dissolved in this solvent by heating and stirring at 70° C. for 1.5 hours. At the end of that time there is added to this solution 12 parts of methyl 10-phenylolstearate, and a dispersion of 1.2 parts of carbon black in 8.4 parts of the same plasticizer. This mixture is then heated and stirred for two hours before being used to apply further coatings.

Following the same coating procedure as employed for solution A, 17 coats of solution B are applied yielding a coated fabric having a coating weight of 9.6 oz./50" yd. This coated fabric resists 280,000 flexes when tested on the Schiltknecht flex machine at 0° F., its initial stiffness as measured by the Tinius Olsen stiffness tester is 48 and this value is only increased 29% after the sample has been aged for one week at 105° C. The initial cold crack of this material is −42° F. and is only increased to −31° F. after the heat aging described. This coated fabric is embossed at 210° F. with an alligator grain to yield a soft, pliable but durable leather substitute.

*Example III*

Ten parts of the chemically modified polyamide described in Example II is dissolved in 26.6 parts of ethanol and 11.4 parts of water to which solution is added 0.5 part of a spirit-soluble black dye of color index number 864 (Du Pont Nigrosine SSB). The solution is prepared by heating and stirring under reflux. This solution is applied as a topcoat to a 1.32–53" sateen which has previously been coated with about 9 oz./50" yd. of a nylon composition comprising 40 parts of an interpolyamide derived from 40 parts of hexamethylenediammonium adipate, 30 parts of hexamethylenediammonium sebacate and 30 parts of epsilon-caprolactam; 20 parts of 1,10-diphenylol-octadecane; 20 parts of butyl phthalyl butyl glycolate and 20 parts of bone black pigment. The application of three coats of the solution described above, with solvent evaporation at 60°–70° C. after each coat, furnishes a topcoat finish which is about 0.001" thick. This finish is glossy and extremely lustrous. The pliable product resembles the best patent leather in appearance, while far surpassing it in resistance to crazing during usage in shoe uppers or handbags. This superiority is especially noted when comparing the craze resistance at low temperature of patent leather and the material just described. The nylon interpolymer mentioned can be admixed in solution with a spirit-soluble dye and used in the same manner as a top-coating material, but it does not yield as good a product with respect to appearance and scuff resistance.

Similarly the chemically modified polyamides described in this application may be advantageously employed as topcoats for other fabrics previously coated with compositions based on pyroxylin, cellulose acetate, vinyl chloride/vinyl acetate copolymers, rubber, etc. in each case with an improvement in surface durability and resistance to organic liquids.

*Example IV*

An N-methoxymethyl polyhexamethylene adipamide polymer is prepared from a sample of polyhexamethylene adipamide having a relative viscosity of 90. The chemically modified polymer contains 47% of the amide groups substituted with methoxymethyl groups and methylol groups combined and has 2.4% of the amide groups substituted with methylol groups.

A solution of this polymer is prepared by dissolving 25 parts in 75 parts of a solvent comprising 80 parts of ethanol and 20 parts of water. Two coats of this solution are spread with a doctor blade on 1.32–53" sateen with drying at 70° C. between coats.

A calendering composition is prepared comprising 78 parts of the chemically modified polyamide, 20 parts of "Micronex" carbon black and 2 parts of palm oil. This composition is milled to a homogeneous state between rolls at 100° C. The composition is then transferred to a 3 roll calender where, by standard procedures, a 0.010" film is calendered upon the previously coated face of the sateen fabric. The latter operation is carried out at 120° C. The calendering temperature may be advantageously reduced to 80°–90° C. if the calendering composition is first milled with hot water. In addition, it is desirable to carry out the calendering operation in the presence of water.

The resulting coated fabric is extremely pliable, tough and well suited for use as shoe or upholstery material.

Aliphatic alcohols, and particularly those containing less than 3 carbon atoms, are preferably used in preparing the N-alkoxymethyl polyamides described herein. The best products are obtained with methanol or ethanol. Other suitable alcohols include propanol, butanol, isobutanol, cyclohexanol, furfuryl alcohol, methoxymethyl alcohol, octyl alcohol, lauryl alcohol, stearyl alcohol, unsaturated alcohols, such as allyl alcohol, oleyl alcohol, dimethyl(vinylethinyl)carbinol, alcohols containing additional functional groups such as ethanol formamide, dimethyl-beta-hydroxyethylamine, di- and polyfunctional alcohols such as ethylene glycol, glycerol, triethanolamine, and ethylene chlorhydrin. The use of long chain monohydric alcohols (at least 12 carbon atoms) is desirable when modified polyamides having good water resistance are desired.

The polyamides used in making the present nitrogen substituted products are obtained from polyamide-forming reactants of the kind described in the previously mentioned patents. These polyamides, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups.

These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have a unit length, defined in previously mentioned patents, of at least 7. The average number of carbon atoms separating the amide groups in these polyamides, which are an integral part of the main polymer chain, is at least two.

These linear polyamides include also polymers, as for instance the polyester-amides, obtained by admixture of other linear polymer-forming reactants, as for instance glycol-dibasic acid mixtures or hydroxy acids, with the mentioned polyamide-forming reactants. Both the simple and modified linear polyamides contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

Polyamides of the above mentioned kind which are especially well adapted for making the modified polyamide coatings described herein include polyhexamethylene adipamide, polyhexamethylene sebacamide; polyamides derived from epsilon-aminocaproic acid or 12-aminostearic acid; polyamides derived from diamines and dibasic acids or monoaminomonocarboxylic acids having heteroatoms in the chain, such as triglycoldiamine, diglycolic acid, or 9-amino-5-thiatricosanoic acid; polyamides derived from polyamide-forming ingredients having lateral substitution, such as beta-methyladipic acid; polyamides derived from polyamide-forming ingredients containing aromatic or aliphatic rings such as 1,4-bis-(beta-aminoethyl)-benzene or 1,4-diaminocyclohexane. In addition, interpolymers of any of the above mentioned polyamides are also operable.

The amount and kind of plasticizer used with the N-substituted products claimed herein will vary with the degree of substitution of the polymer. For example, N-methoxymethyl polyhexamethylene adipamide with greater than 44% total amide substitution is generally compatible with up to 10-20% of most of the common ester-type plasticizers, as well as the common nylon plasticizers. However, such polymers are so inherently pliable as generally to require little or no plasticization. Less highly substituted polymers are generally incompatible with simple ester-type plasticizers, although small amounts of these may be incorporated in the presence of typical nylon plasticizers. Such plasticizers, which are preferred, include aromatic sulfonamides, such as toluenesulfonamide, amylbenzenesulfonamide, N-ethyl amylbenzenesulfonamide, phenols such as diphenyloloctadecane, octyl phenol, methyl 10-phenylolstearate, salicylamides, and other known softeners for the nylons. Solvents for use in the preferred method of solvent application include the common nylon solvents, such as phenols, organic acids, and inorganic acids, and also alcohols, either alone or blended with other materials, notably water or halogenated hydrocarbons such as chloroform and trichloroethylene. Aqueous or alcoholic solutions of certain inorganic salts, namely, alkaline earth halides and alkali thiocyanates can also be used. A particularly preferred solvent comprises mixtures of ethanol with water. The preferred ratio for polymer solubility is at or near 70 parts by weight absolute ethanol and 30 parts water. In the presence of long chain plasticizers a 90:10 blend of alcohol:water is preferred. Substituted or unsaturated alcohols may also be used.

Coats of the modified polyamide as thin as 0.0001 inch occasionally serve to yield desirable improvements, while thicknesses up to 0.5 inch may sometimes be found necessary. The most satisfactory thicknesses are usually 0.0005 inch to 0.02 inch.

In calendering or heat laminating procedures, the temperature at which the process is conducted will vary with the composition being used. Thus, a polymer with a low degree of substitution and containing no modifying agents may be worked briefly at temperatures as high as 150° C., although long handling at this temperature is undesirable. Polymers with a high degree of substitution or those containing modifying agents such as water, solvent, plasticizer, resins, or pigments or fillers, can be handled at lower temperatures, although compositions which can be milled and calendered at temperatures much below 100° C. are generally found unsatisfactory in their thermal properties for most uses.

In subsequent heat treatments of the coated product, the time and temperature of heating will be varied with the degree of modification which it is desired to effect. For most purposes, a temperature above 70° C. and below the melting point of the composition, i. e., generally below 150° C., is preferred. The time of treatment may vary from a few seconds to several days.

Particularly valuable products result from the methods of practicing the invention which include one or more of the procedures consisting of the surface hydrolysis obtained by warming in dilute mineral acid as previously mentioned, application of the present nitrogen substituted nylon coating over a resin coating previously applied to the fabric; and incorporating into the applied nitrogen substituted coating an acidic catalyst followed by baking. This catalyst can be any relatively non-volatile, oxygen-containing acidic substance. Suitable substances of this kind are inorganic acids such as phosphoric, sulfuric, and boric acids, organic acids such as benzoic acid, oxalic acid, stearic acid, phenol, substituted phenols, and in general any acidic substance having a boiling point at least 10° C. higher than the temperature at which the heat treatment is conducted. However, it is occasionally desirable to use a catalyst of sufficient volatility that it may be removed by vaporization or sublimation after completion of the heat treatment. This is especially desirable when the flexible base is a material such as cloth which is subject to degradation by acids. The amounts of catalyst which are used may be varied; in general 0.1–2% based on the polymer is sufficient to catalyze the reaction, but where phenols are used which may also serve as plasticizers, as much as 50% may be incorporated.

The present coated fabrics are valuable as upper material in footwear since they are flexible over a wide temperature range and possess extremely high resistance to cracking failure on repeated flexing, and have a durable surface highly resistant to scuffing and abrasion. A property of special advantage in shoe manufacture resides in the resistance of the coating to cracking when placed under tension and exposed to wet steam. Exposure of the coated fabric to these conditions occurs during the fabrication into shoes of nylon coated fabric upper materials. In making shoes with thermoplastic toe stiffeners (box toes) the partially lasted shoe with the forepart of the upper under moderate tension, is exposed to steam to soften the toe stiffener prior to lasting the toe of the shoe. Coatings comprising the present N-methoxymethyl polyhexamethylene adipamides are entirely resistant to this treatment and show no adverse effects whatever.

The generally excellent adhesion of the N-alkoxymethyl polyamides described herein permits their ready application to a wide range of flexible base materials, with resulting general improvements in such important properties as surface toughness, solvent resistance, vapor and gas impermeability, etc. Representative flexible base materials include fabrics previously coated with a pigmented plasticized composition containing a vinyl chloride: vinyl acetate (95:5) interpolymer or over a cloth fabric carrying a coating comprising rubber, or a pigmented pyroxylin composition, or another polyamide such as the interpolymer of hexamethylenediammonium adipate, hexamethylenediammonium sebacate and epsilon-caprolactam combined in a 40:30:30 ratio.

Although the present coatings are advantageously used on flexible articles in general, the most valuable products are those comprising flexible sheet materials, which include ribbons, films, etc., such as sheets of rubber, synthetic rubbers, paper, leather, natural and synthetic resins, including resin-coated fabrics, and fabrics such as knitted, woven, or felted cotton, silk, rayon, nylon, or wool.

The products of this invention present, as previously pointed out, a combination of toughness, pliability, gas impermeability and solvent resistance which makes them valuable in a large number of uses. They are of particular value in various leather uses other than in shoe upper material, for example, as upholstery material. They are also of use in handbags, luggage, garments, gloves, etc. Advantage may be taken of the excellent solvent resistance of the products, especially those which have been heat treated, by the fabrication of garments, covering materials, and containers possessing a high degree of impermeability to and insolubility in water and organic liquids and vapors. Coated papers are of value as currency and as containers for foods, oils, etc. Neoprene and fabrics coated with the present compositions are useful in the construction of gasoline-resistant fuel cell interliners for fuel containers of the ordinary and self-sealing type.

As many apparently widely different embodiments of this invention may be made without departing from the spirit and scope thereof, it is to be understood that we do not limit ourselves to the specific embodiments thereof except as defined in the appended claims.

We claim:

1. A flexible article coated with a film of N-alkoxymethyl polyamide which comprises the reaction product of a mixture of formaldehyde and an alcohol in the presence of an acid selected from the group consisting of formic acid and phosphoric acid, with a synthetic linear polyamide having hydrogen-bearing amide groups as an integral part of the main polymer chain and separated by an average number of carbon atoms of at least two and having a relative viscosity above 40, said N-alkoxymethyl polyamide having less than 4% of the amide nitrogens substituted by methylol groups and a sufficient number of the remaining amide nitrogens substituted by alkoxymethyl groups so that the combined number of amide nitrogens substituted by both groups, respectively, is at least 28% of the total number of amide nitrogens in said alkoxymethyl polyamide.

2. Flexible sheet material comprising a fabric coated with a film of N-alkoxymethyl polyamide which comprises the reaction product of a mixture of formaldehyde and an aliphatic monohydric alcohol in the presence of an acid selected from the group consisting of formic acid and phosphoric acid, with a synthetic linear polyamide having hydrogen-bearing amide groups as an integral part of the main polymer chain and separated by an average number of carbon atoms of at least two and having a relative viscosity above 40, said N-alkoxymethyl polyamide having less than 4% of the amide nitrogens substituted by methylol groups and a sufficient number of the remaining amide nitrogen substituted by alkoxymethyl groups so that the combined number of amide nitrogens substituted by both groups, respectively, is at least 28% of the total number of amide nitrogens in said alkoxymethyl polyamide.

3. The flexible fabric sheet material set forth in claim 2 in which said alcohol contains less than 3 carbon atoms.

4. A flexible article coated with a film of N-alkoxymethyl polyhexamethylene adipamide which comprises the reaction product of a mixture of formaldehyde and an aliphatic alcohol in the presence of an acid selected from the group consisting of formic acid and phosphoric acid, with polyhexamethylene adipamide having a relative viscosity above 40, said N-alkoxymethyl polyhexamethylene adipamide having less than 4% of the amide nitrogens substituted by methylol groups, and a sufficient number of the remaining amide nitrogens substituted by alkoxymethyl groups so that the combined number of amide nitrogens substituted by both groups, respectively, is at least 28% of the total number of amide nitrogens in said alkoxymethyl polyamide.

5. A flexible article coated with a film of an N-methoxymethyl polyhexamethylene adipamide which comprises the reaction product of formaldehyde and methyl alcohol in the presence of an acid selected from the group consisting of formic acid and phosphoric acid, with polyhexamethylene adipamide having a relative viscosity above 40, said N-methoxymethyl polyhexamethylene adipamide having less than 4% of the amide nitrogens substituted by methylol groups and a sufficient number of the remaining amide nitrogens substituted by methoxymethyl groups so that the combined number of amide nitrogens substituted by both groups, respectively, is at least 28% of the total number of amide nitrogens in said alkoxymethyl polyamide.

6. A flexible article coated with a film of an N-ethoxymethyl polyhexamethylene adipamide which comprises the reaction product of a mixture of formaldehyde and ethyl alcohol in the presence of an acid selected from the group consisting of formic acid and phosphoric acid, with polyhexamethylene adipamide having a relative viscosity above 40, said N-ethoxymethyl polyhexamethylene adipamide having less than 4% of the amide nitrogens substituted by methylol groups and a sufficient number of the remaining amide nitrogens substituted by ethoxymethyl groups so that the combined number of amide nitrogens substituted by both groups, respectively, is at least 28% of the total number of amide nitrogens in said alkoxymethyl polyamide.

7. The flexible coated articles set forth in claim 1 in which said synthetic linear polyamide has a relative viscosity above 80.

8. The flexible coated article set forth in claim 4 in which said synthetic linear polyamide has a relative viscosity above 80.

9. The flexible coated article set forth in claim 5 in which said synthetic linear polyamide has a relative viscosity above 80.

10. The flexible coated article set forth in claim 6 in which said synthetic linear polyamide has a relative viscosity above 80.

11. A process which comprises applying to a flexible article a coating comprising a film of N-alkoxymethyl polyamide containing from 0.1% to 2.0% by weight of said polyamide of a nonvolatile oxygen-containing acid catalyst and heating the coated product until hydrolysis of the alkoxymethyl groups takes place, said N-alkoxymethyl polyamide being the reaction product of a mixture of formaldehyde and an alcohol in the presence of an acid selected from the group consisting of formic acid and phosphoric acid, with a synthetic linear polyamide having a hydrogen-bearing amide group and having a relative viscosity above 40, said N-alkoxymethyl polyamide having less than 4% of the amide nitrogens substituted by methylol groups and a sufficient number of the remaining amide nitrogens substituted by alkoxymethyl groups so that the combined number of amide nitrogens substituted by both groups, respectively, is at least 28% of the total number of amide nitrogens in said N-alkoxymethyl polyamide, said synthetic linear polyamide being a polymeric amide which on hydrolysis with hydrochloric acid yields material selected from the group consisting of (a) monoaminomonocarboxylic acid hydrochloride; (b) a mixture of diamine hydrochloride and dibasic carboxylic acid, and (c) a mixture of amino alcohol hydrochloride and dibasic carboxylic acid.

12. A process which comprises applying to a flexible article a coating comprising a film of N-alkoxymethyl polyamide and heating the coated product while in contact with dilute mineral acid until hydrolysis consisting of surface hydrolysis of said film takes place, said N-alkoxymethyl polyamide being the reaction product of a mixture of formaldehyde and an alcohol in the presence of an acid selected from the group consisting of formic acid and phosphoric acid, with a synthetic linear polyamide having a hydrogen-bearing amide group and having a relative viscosity above 40, said N-alkoxymethyl polyamide having less than 4% of the amide nitrogens substituted by methylol groups and a sufficient number of the remaining amide nitrogens substituted by alkoxymethyl groups so that the combined number of amide nitrogens substituted by both groups, respectively, is at least 28% of the total number of amide nitrogens in said N-alkoxymethyl polyamide, said synthetic linear polyamide being a polymeric amide which on hydrolysis with hydrochloric acid yields material selected from the group consisting of (a) monoaminomonocarboxylic acid hydrochloride; (b) a mixture of diamine hydrochloride and dibasic carboxylic acid, and (c) a mixture of amino alcohol hydrochloride and dibasic carboxylic acid.

BOYNTON GRAHAM.
HOWARD S. TURNER.

REFERENCES CITED

The following references are of record in the file of this patent:

UNITED STATES PATENTS

| Number | Name | Date |
| --- | --- | --- |
| 2,071,250 | Carothers | Feb. 16, 1937 |
| 2,096,181 | Jahrstorfer | Oct. 19, 1937 |
| 2,141,169 | Catlin | Dec. 27, 1938 |
| 2,173,005 | Strain | Sept. 12, 1939 |
| 2,188,332 | Carothers | Jan. 30, 1940 |
| 2,244,184 | Austin | June 3, 1941 |
| 2,252,554 | Carothers | Aug. 12, 1941 |
| 2,292,442 | Hanford | Aug. 11, 1942 |
| 2,317,181 | D'Alelio | Apr. 20, 1943 |
| 2,412,993 | Larchar | Dec. 24, 1946 |